United States Patent [19]

Nishimura et al.

[11] Patent Number: 4,796,177

[45] Date of Patent: Jan. 3, 1989

[54] ADDRESS EXTENSION SYSTEM

[75] Inventors: Hisayuki Nishimura, Kawasaki; Tomochika Shibata, Tama, both of Japan

[73] Assignee: Fujitsu Limited, Kawasaki, Japan

[21] Appl. No.: 935,681

[22] PCT Filed: Apr. 30, 1986

[86] PCT No.: PCT/JP86/00219
§ 371 Date: Nov. 7, 1986
§ 102(e) Date: Nov. 7, 1986

[87] PCT Pub. No.: WO86/06521
PCT Pub. Date: Nov. 6, 1986

[30] Foreign Application Priority Data

Apr. 30, 1985 [JP] Japan ................................ 60-092461
Apr. 30, 1985 [JP] Japan ................................ 60-092495

[51] Int. Cl.⁴ ............................................. G06F 12/06
[52] U.S. Cl. .................................................. 364/200
[58] Field of Search ... 364/900 MS File, 200 MS File; 365/78

[56] References Cited

U.S. PATENT DOCUMENTS

| 4,092,715 | 5/1978 | Scriver ............................ 364/200 |
| 4,117,263 | 9/1978 | Yeh ................................. 364/200 |
| 4,215,402 | 7/1980 | Mitchell et al. .................. 364/200 |
| 4,361,868 | 11/1982 | Kaplinsky ....................... 364/200 |
| 4,395,764 | 7/1983 | Matsue ............................. 365/78 |
| 4,453,212 | 6/1984 | Gaither et al. .................. 364/200 |

Primary Examiner—Gareth D. Shaw
Assistant Examiner—Debra A. Chun
Attorney, Agent, or Firm—Staas & Halsey

[57] ABSTRACT

An address extension system is provided for generating a physical address by summing a segment starting point address and an offset. Conventionally, the content of a segment register is shifted by a predetermined amount and summed to the offset, and the address space and the segment starting point address are fixed. In contrast, the present address extension system includes a register for storing shift amount data and the shift amount is set in the register and shifted. An address extension system is also proposed wherein the shift amount is written in a predetermined bit of the segment register. As a result, the address space can be extended and the segment starting point address can be arbitrarily set.

7 Claims, 5 Drawing Sheets

ADDRESS EXTENSION SYSTEM

BACKGROUND OF THE INVENTION

The present invention relates to an address extension system in a processor of a data processing unit.

A system for dividing an address space into predetermined logical address spaces, i.e., segments, and generating a physical address as a sum of a starting point address of a segment and a relative address, i.e., an offset, has been recently adapted as a memory access system.

For example, a 16-bit processor has a 16-bit segment register and can direclty designate a 64-k byte address space. The 64-k byte address space is determined as a space for a segment. A physical address is obtained and generated by summing a starting point address of the segment and an offset.

However, since the address space which can be designated by the 16-bit starting point address is limited, the starting point addresses are shifted by adding a predetermined number of "0"s to the least significant bit (LSB) of the 16-bit addresses within the processor. For example, a 4 bit shifting is carried out so that the starting point addresses are extended to 20 bits, which corresponds to 1M byte.

In the above system, when the shift amount is increased, a maximum 32-bit address space can be obtained. However, the segment interval is expanded, and since the shift amount is predetermined, storage segments cannot be arbitrarily set for each program.

Generally, a processor has: an arithmetic and logic unit ALU; a segment register for storing a starting point address of a segment which is being executed; a program counter for indicating an offset being executed; a plurality of registers, and the like, such as a control register; an adder, an address buffer for temporarily storing an address signal; a data buffer, and an instruction decoder for decoding an instruction.

In the processor having the above arrangement, a physical address, generated by summing contents of the segment register and the program counter by the adder, is used for accessing a memory through the address buffer. An instruction, data, or the like, which is stored in the memory is read out and is decoded by the instruction decoder, and a designated logical operation is performed. Subsequently, the program counter is set to a next address, and processing is continued in accordance with the above procedure.

In the above operation, the initial values of the segment register and the program counter are set by an operating system OS when a program to be executed is loaded. When the processor is a 16-bit machine, the segment register, the program counter, the register, and the like, generally comprise 16 bits, and the 1-M byte address space is obtained by shifting the content of the segment register by 4 bits and summing it with the content of the program counter.

In the above summing, 4 "0"s are added to the least significant bit (LSB) of the segment register and the obtained content is summed with the value of the program counter. As a result, the segment starting point addresses are extended to 20 bits, the selection is carried out per 4 bits (which corresponds to per 16 bytes), and the selection concerning up to 1M byte becomes possible.

In the above system, when the address space is to be extended due to an increase in the memory capacity of the control unit, the shift amount may be increased. However, the shift amount is predetermined. When the shift amount is set at a maximum, the intervals of possible segment start point addresses are increased. Therefore, when a maximum address space is not used, the range of selection for storage segments for each different program is narrowed, resulting in a non-used area in the memory.

In consideration of the above situation, an address extension system wherein an address space can be extended and segments can be arbitrarily set has been desired. However, until the present invention a satisfactory system has not been available.

SUMMARY OF THE INVENTION

It is an object of the present invention to obtain an improved address extension system in a processor, wherein the shift amount of a programmable segment starting point address can be set, an address space can be extended, and a segment starting point address can be arbitrarily selected, so that the address space can be arbitrarily set in accordance with the program size.

According to an aspect of the present invention, there is provided an address extension system in a processor for generating a physical address by shifting a content of a segment register, storing starting point addresses of a segment and summing the output as the result of the shifting and an offset, designating an address in the segment, the system including: a unit, having a shift amount data storing register, for setting data of shift amount in the shift amount data storing register; a shifting unit for shifting a content of the segment register in accordance with the shift amount data; and a unit for summing the output of the shifting unit and the offset, designating an address in the segment; whereby the address space is extended and an address of a starting point of a segment is able to be selected as desired.

According to another aspect of the present invention, there is provided an address extension system in a processor for generating a physical address by shifting a content of a segment register, storing a starting point address of a segment and summing the output as the result of the shifting and an offset, the system including: a unit for setting data of shift amount in a predetermined bit of the segment register; a unit for shifting the content of the segment register using the information of the bit as a shift amount designation; and a unit for summing the output of the shifting unit and the offset; whereby the address space is extended and an address of a starting point of a segment is able to be selected as desired.

DETAILED DESCRIPTION OF THE PREFERRED EMBODIMENT

Figure 1:
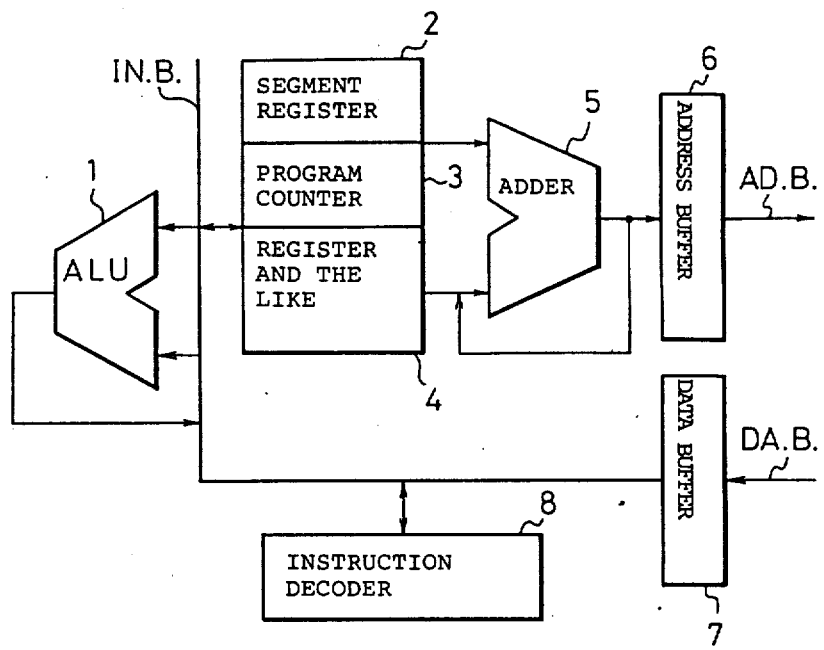
FIG. 1 is a block diagram showing a configuration of a conventional processor.
Figure 2:
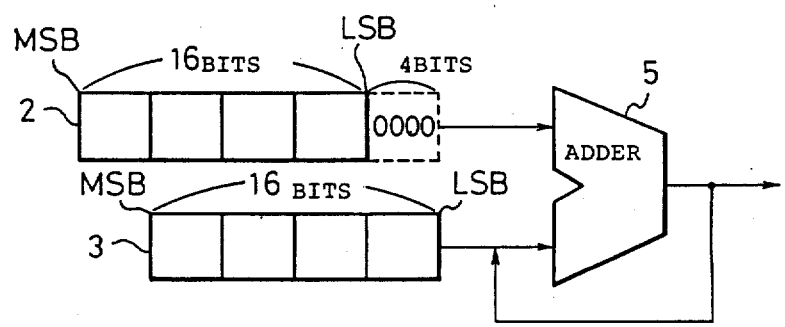
FIG. 2 is a block diagram for explaining an address generating system in the conventional processor.

Before describing the preferred embodiments, an address generating system of a conventional processor will be described with reference to FIGS. 1 and 2. FIG. 1 is a block diagram of the processor, and FIG. 2 is a block diagram of a physical address generating system. In FIG. 1, reference numeral 1 denotes an arithmetic and logic unit ALU; 2 a segment register for storing a starting point address of a segment which is being executed; 3 a program counter for indicating an offset being executed; 4 a plurality of registers, and the like, such as a control register; 5 an adder; 6 an address buffer for temporarily storing an address signal; 7 a data buffer; 8 an instruction decoder for decoding an instruction; IN.B., an internal bus; AD.B. an address bus; and DA.B. a data bus.

In the processor having the above arrangement, a physical address, generated by summing contents of the segment register 2 and the program counter 3 by the adder 5, is used for accessing a memory through the address buffer 6. An instruction, data, or the like, which is stored in the memory is read out and is decoded by the instruction decoder 8, and a designated logical operation is performed. Subsequently, the program counter 3 is set to a next address, and processing is continued in accordance with the above procedure. In the above operation, the initial values of the segment register 2 and the program counter 3 are set by an operating system OS when a program to be executed is loaded.

When the processor is a 16-bit machine, the segment register 2, the program counter 3, the plurality of registers 4 generally comprise 16 bits, and the 1M byte address space is obtained by shifting the content of the segment register 2 by 4 bits and summing it with the content of the program counter 3.

FIG. 2 shows the summing in detail. 4 "0"s are added to the least significant bit (LSB) of the segment register 2 and the obtained content is summed with the value of the program counter 3. As a result, the segment starting point addresses are extended to 20 bits, the selection is carried out per 4 bits (which corresponds to per 16 bytes), and selection up to 1M bytes becomes possible.

When the address space is to be extended due to an increase in the memory capacity of the control unit, the shift amount may be increased. However, according to the conventional system, the shift amount is predetermined. When the shift amount is set at a maximum, the intervals of possible segment start point addresses are increased. Therefore, when a maximum address space is not used, the range of selection for storage segments for each different program is narrowed, resulting in an unused area in the memory.

Figure 3:
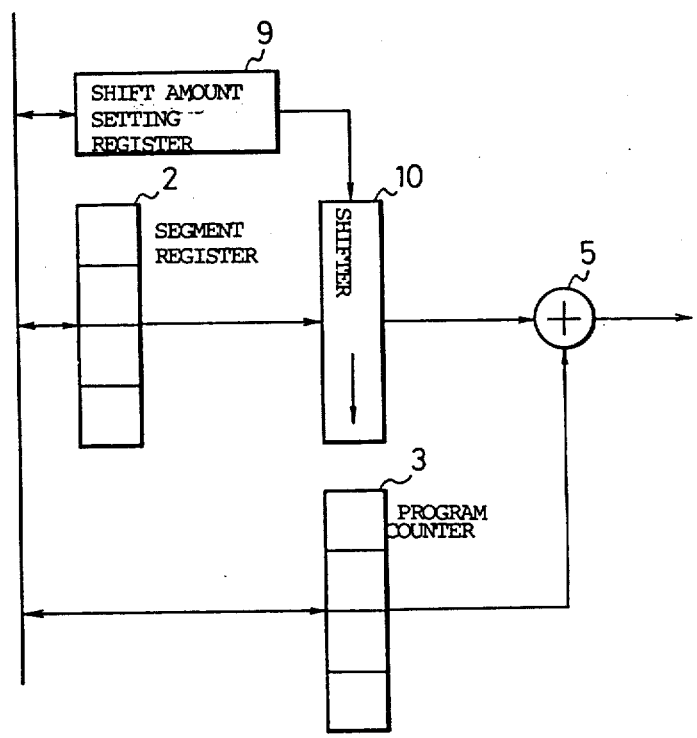
FIG. 3 is a block diagram of an address extension system according to the present invention.

FIG. 3 shows an address extension system according to a first embodiment of the present invention. The system shown in FIG. 3 includes: means 9, having a shift amount data storing register, for setting data of shift amount in the shift amount data storing register; shifting means 10 for shifting content of the segment register 2 in accordance with the shift amount data; and means 5 for summing the output of shifting means 10 and the offset.

In the system shown in FIG. 3, there is provided a register 2 for storing the shift amount of the shifting the content of the segment register, and means for setting shift amount data by a program, that is, instruction means, and the value of the segment register is shifted by the shift amount data designated by the instruction means, and a segment starting point address can be arbitrarily set, so that an address space can be adequately set.

Figure 4:
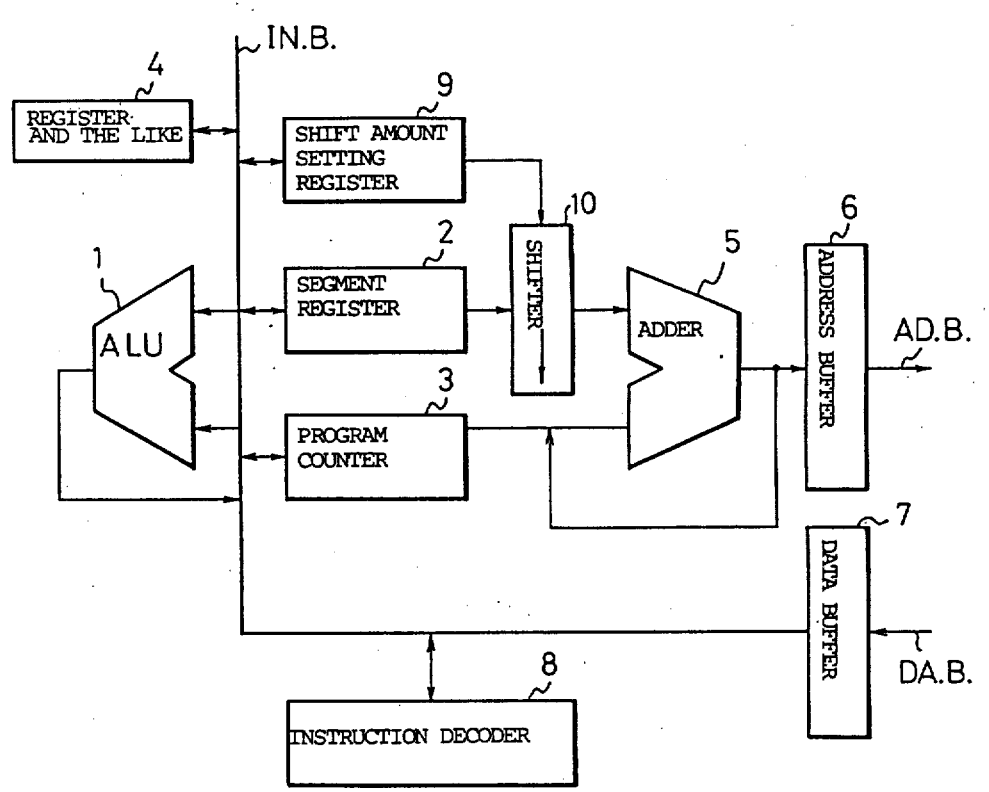
FIG. 4 is a block diagram of an address extension system in a processor of according to the present invention.

FIG. 4 shows the address extension system shown in FIG. 3 in a processor according to the present invention.

In FIG. 4, reference numeral 9 denotes a shift amount setting register which can set a shift amount by an instruction of a program; 10 a shifter having a selector and so on; 5 an adder having a predetermined number of bits; 6 an address buffer having the predetermined number of bits; AD.B. an address bus for the address buffer 6; and 8 an instruction decoder having a function to decode a shift amount set instruction.

With the above arrangement, the shifter 10 shifts the content of the segment register 2 to the adder 5 in accordance with the shift amount data stored in the shift amount setting register 9. The adder 5 sums the shifted segment starting point address and the content of the program counter 3 and supplies the sum to the address bus AD.B.

The shift amount is set in the following manner:

(i) Each program defines a predetermined shift amount.

(ii) When the operating system OS is compiled, the shift amount is determined as a table. The program is stored at a predetermined address when the power source is turned on. The shift amount is set by a storing instruction when the program processing is started.

The data buffer 7 receives an instruction from an external ROM memory (not shown), or the like. The instruction stored in the data buffer 7 is stored in a register in the instruction decoder 8.

Then, the instruction decoder 8 decodes the content of the stored instruction and generates a microcode (code for supporting initialization of the respective sections of the processor) corresponding to the instruction and having a plurality of parallel binary signals. Each signal of the microcode is supplied to the respective sections of the processor. Thus, when the instruction is a so-called move instruction to jump to a specific address within a specific segment, the following operation is executed. An access request for an external bus signal line is performed, and a 1-byte operand is loaded in the data buffer 7.

Subsequently, the operand is read out from the data buffer 7 and stored in the register of the instruction decoder 8. The instruction decoder 8 reads out the specific address stored in the register 4, as the source address and sets the readout address in a register connected to the program counter 3 or a register connected to the adder 5, provided separately from the program counter 3. The adder 5 sums the stored content of the program counter 3 (or its register) and the content obtained by shifting the content of the segment register 2 by the shifter 10. During address calculation, in a normal addressing mode, the content of the segment register 2 is shifted by, for example, 4 bits, and is summed with the content of the program counter 3 (or its register). In an extended addressing mode, the content of the segment register 2 is shifted by, for example, 8 bits, and is subject to addition.

Figure 5:
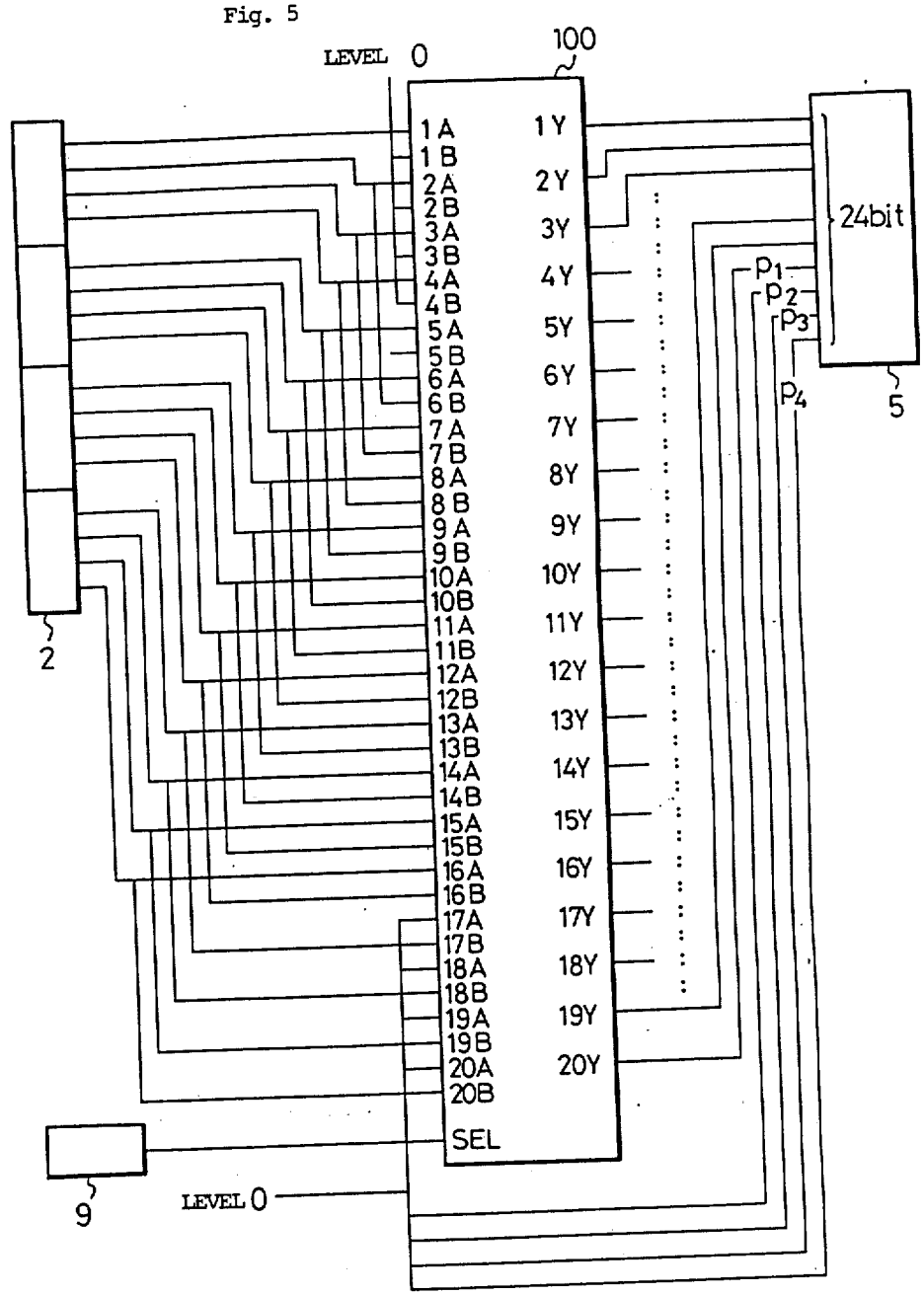
FIG. 5 is a schematic diagram of an arrangement of a shifter of the system shown in FIG. 4.

FIG. 5 shows a configuration of the shifter 10 in detail. In this embodiment, a multiplexer 100 is used as the shifter 10. The multiplexer 100 includes a group of input terminals 1A to 20A, a group of input terminals 1B to 20B, a group of output terminals 1Y to 20Y, and a selection terminal SEL. In the multiplexer 100, when a signal in the shift amount setting register 9 is set at level "1" by mode switching and the input level of the selection terminal SEL is set at "1", the group of input terminals 1A to 20A is connected to the output terminals 1Y to 20Y. In this case, the normal addressing mode is set, and a 16-bit signal having upper four "0" bits is set in the segment register 2, and a resultant 20-bit signal is output. Meanwhile, the 20-bit signal line and four "0" level signal lines P1 to P4 are connected to the adder 5. Since the respective signal levels are supplied to the adder 5, a 24-bit segment data having the upper 4 bits of level "0" and the lower 4 bits of level "0" is supplied.

On the other hand, when the signal supplied to the selection terminal SEL of the multiplexer 100 is at level "0", the group of the input terminals 1B to 20B is connected to the output terminals 1Y to 20Y. In this case, the processor operates in the extended addressing mode. The level of the signla line among a group of 20 output signal lines, in total, which corresponds to the lower 4 bits is at level "0", and the group of signal lines corresponding to the upper 16 bits corresponds to a 16-bit signal set in the segment register 2. The lower 4 bits of the 24-bit signal lines, in total, are fixed at level "0" by the signal lines P1 to P4 and supplied to the adder 5, and an output signal from the multiplexer 100 is supplied to the adder 5 as the upper 20-bit signal.

The destination address of the move instruction can be accessed by the physical address calculated in the above manner.

As described above, the processor sets the shift amount and shifts the segment register 2, and sums the shifted amount and the content of the program counter 3 to generate a physical address. Then, the program can be accessed.

In a non-resident program, and the like, the operating system OS generates the shift amount corresponding to the address of the storage address and causes the register to shift accordingly.

The above description has been made with respect to a segment register. However, the present invention can be similarly applied to a case wherein a stack area, a data area, or the like, is designated by segments.

Figure 6:
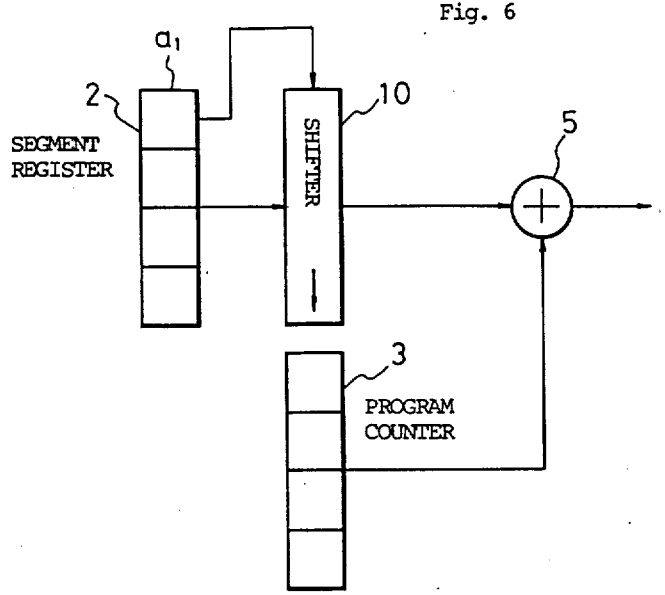
FIG. 6 is a block diagram of a an address extension system according to another embodiment of the present invention.

FIG. 6 shows an address extension system according to another embodiment of the present invention. The system shown in FIG. 6 includes: means 2 for setting data of shift amount in a predetermined bit "a", of the segment register 2; means 10 for shifting the content of the segment register 2 using the information of the bit as a shift amount designation; and means 5 for summing the output of the shifting means 10 and the offset.

The system shown in FIG. 6 includes a means for assigning a predetermined bit of the segment register to the shift amount. When the segment starting point address is designated, the shift amount is written in the corresponding bit. As a result, the segment starting point address is shifted by the designated amount and summed with the offset.

For example, when the lower 4 bits are set as the shift amount, shift designation by 0, 1, 2, . . . , 16 bits is possible. Furthermore, the starting point addresses can be set every 16 bytes, 256 bytes, 4k bytes, or 64k bytes corresponding to the 4—, 8—, 12—, and 16-bit shifts.

Figure 7:
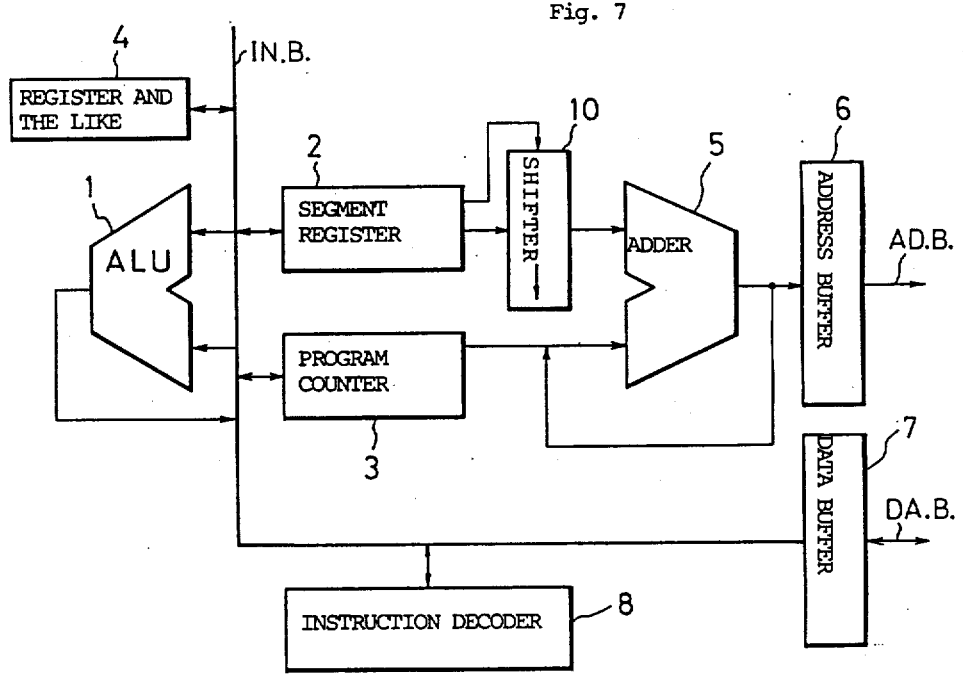
FIG. 7 is a block diagram of the address extension system shown in FIG. 6 in a processor according to the present invention.

FIG. 7 shows the address extension system of FIG. 6 in a processor as an alternate embodiment of the present invention.

In FIG. 7, reference numeral 10 denotes a shifter, connected to a predetermined bit of the segment register 2, for example, the lower 4 bits, for adding "0"s to the least significant bit (LSB) in accordance with the content of the segment register 2 and then shifting the resultant bits to the left. Note that the shifter 10, the adder 5, the address buffer 6, and the address bus AD.B. have a bit width capable of designating a maximum address space.

The operation of the system shown in FIG. 7 will now be described. Each program of an operation system OS writes a shift amount at a designated bit of a segment starting point address so that the program, data, and the like, can be stored in the designated memory.

(i) When the execution program is started, the operation system OS causes the segment register 2 and the program counter 3 to store the segment starting point address and a predetermined value, respectively.

(ii) The shifter 10 reads out the predetermined bit information of the segment register 2, shifts the content of the segment register 2 in accordance with the thus obtained instruction, and outputs the shifted content to the adder 5.

(iii) The adder 5 sums the output and the content of the program counter 3 and outputs the sum to the address bus AD.B through the address buffer 6.

As described above, since the shift amount of the segment register can be set in a programmable manner, an address space of the control unit can be easily extended.

Although certain preferred embodiments have been shown and described, it should be understood that many changes and modifications may be made therein without departing from the scope of the appended claims.

What is claimed is:

1. An address extension system in a processor for generating a physical address equal to a sum of a starting point address of a segment and an offset, by shifting a content of a segment register, storing the starting point address of the segment and summing the result of said shifting and the offset, designating an address in the segment, said system comprising:
    (a) first means, having a shift amount data storing register, for setting a shift amount in said shift amount data storing register;
    (b) second means for shifting a content of said segment register in accordance with said shift amount; and
    (c) third means for summing an output of said second means and said offset, designating an address in the segment.
    whereby the address space is extended and a starting point address of a segment can be selected as desired.

2. An address extension system in a processor for generating a physical address by shifting a content of a segment register, storing a starting point address of a segment and summing the output as a result of said shifting and an offset, said system comprising:
    (a) first means for setting a shift amount in a predetermined bit of said segment register;

(b) second means for shifting a content of said segment register using the information of said predetermined bit as a shift amount designation; and (c) third means for summing an output of said shifting means and said offset, whereby the address space is extended and a starting point address of said segment can be selected as desired.

3. An address extension system according to claim 1, further comprising:

(d) fourth means for setting shift amount data by a program, wherein the content of said segment register is shifted by the desginated shift amount data.

4. An address extension system according to claim 3, further comprising:

(e) an address buffer;

(f) a data buffer;

(g) an instruction decoder, including a register; and (h) a plurality of registers, wherein said data buffer receives an external instruction, said instruction decoder stores said instruction in said instruction decoder register, decodes the content of said instruction and reads out a specific address to be stored in said plurality of registers.

5. An address extension system according to claim 2, further comprising:

(d) fourth means for setting shift amount data by a program, wherein the content of said segment register is shifted by the designated shift amount data.

6. An address extension system according to claim 5, further comprising:

(e) an address buffer;

(f) a data buffer;

(g) an instruction decoder, including a register; and (h) a plurality of registers, wherein said data buffer receives an external instruction, said instruction decoder stores said instruction in said instruction decoder register, decodes the content of said instruction and reads out a specific address to be stored in said plurality of registers.

7. An address extension method for generating a physical address as a sum of a starting point address of an address segment and an offset, said method comprising the steps of:

(a) setting a shift amount in a data storing apparatus;

(b) shifting a content of stored data in accordance with said shift amount data; and (c) summing an output of said shifting and an offset designating an address, whereby the address space is extended and a starting point address of a segment can be selected as desired.

* * * * *

UNITED STATES PATENT AND TRADEMARK OFFICE
CERTIFICATE OF CORRECTION

PATENT NO. : 4,796,177

DATED : January 3, 1989

INVENTOR(S) : Nishimura et al.

It is certified that error appears in the above-identified patent and that said Letters Patent is hereby corrected as shown below:

Col. 1, line 37, change "," to --;--.

Col. 3, line 20, change "IN.B.," to --IN.B.--.

Col. 4, line 54, change "address" to --address,--.

Col. 5, line 22, "signla" should be --signal--.

Col. 6, line 6, change "bits," to --bits--.

Signed and Sealed this

Eleventh Day of July, 1989

Attest:

DONALD J. QUIGG

*Attesting Officer*   *Commissioner of Patents and Trademarks*